US007116634B1

(12) United States Patent
Hanselmann

(10) Patent No.: US 7,116,634 B1
(45) Date of Patent: Oct. 3, 2006

(54) TCP SEQUENCE NUMBER RECOVERY IN A REDUNDANT FORWARDING SYSTEM

(75) Inventor: Peter J. Hanselmann, Pennant Hills (AU)

(73) Assignee: Cisco Technology, Inc., San Jose, CA (US)

( * ) Notice: Subject to any disclaimer, the term of this patent is extended or adjusted under 35 U.S.C. 154(b) by 824 days.

(21) Appl. No.: 10/026,298

(22) Filed: Dec. 21, 2001

(51) Int. Cl.
*G06F 11/00* (2006.01)
*H04L 1/00* (2006.01)

(52) U.S. Cl. ........................... 370/219; 370/242; 714/2
(58) Field of Classification Search ........ 370/216–220, 370/221, 242; 714/2, 3
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,473,599 A | 12/1995 | Li et al. | |
| 6,724,756 B1 * | 4/2004 | Fourie et al. | 370/360 |
| 6,853,617 B1 * | 2/2005 | Watson et al. | 370/218 |
| 6,914,879 B1 * | 7/2005 | Kleine-Altekamp et al. | 370/219 |
| 6,928,576 B1 * | 8/2005 | Sekiguchi | 714/4 |

OTHER PUBLICATIONS

Release notes, for 3Com Corporation, "Conducting a Redundant Route for Network Resiliency", Mar. 1994, NET Builder Family Bridge/Router, pp. 26-29.

J. Moy, RFC 1247, "OSPF Version 2", Jul. 19, 1991.
D. Oran, RFC 1142 "OSI IS-IS Intra-Domain Routing Protocol", Feb. 1990.
Uyless Black, "TCP/I and Related Protocols", 1992, McGraw-Hill, Inc., pp. 226-249.

(Continued)

*Primary Examiner*—Chau Nguyen
*Assistant Examiner*—Kerri M. Dyke
(74) *Attorney, Agent, or Firm*—Beyer Weaver & Thomas, LLP

(57) ABSTRACT

Disclosed are methods and apparatus for facilitating recovery of a data connection that was established between an active router and a host. The data connection is a type of connection that tracks the sequence of data sent between the router and the host. This recovery may occur after a standby router takes over for the active router. For example, a Transmission Control Protocol (TCP) connection between the active router and a host may be recovered after a router switchover (e.g., when the standby router takes over for the active router in a hot standby router protocol system). To accomplish this, at least one sequence number that is associated with data sent from the active router (to the host) is sent to the standby router, and at least one sequence number from data sent from the host is also sent to the standby router. For example, the sequence numbers correspond to the initial SYN packet sent by the active router and the SYN packet sent by the host in response to the active router's SYN packet. These two sequence numbers are obtained for each connection in which the active router is an endpoint. When the standby takes over for the previously active router, the new active router may then recover the connection by sending these two sequence numbers within an acknowledgement packet to the host. The host then responds with the correct sequence numbers for the connection, and the standby router can then continue data transmission to the host using the correct sequence numbers.

34 Claims, 4 Drawing Sheets

OTHER PUBLICATIONS

T. Li, B. Cole, P. Morton, and D. Li, "Cisco Hot Standby Router Protocol (HSRP)," Mar. 1998, Network Working Group RFC 2281 (http://ftp.ietf.org/rfc/rfc2281.txt?number=2281).

Information Sciences Institute, Request for Comments No. 793, entitled, "Transmission Control Protocol—DARPA Internet Program—Protocol Specification," Sep. 1981, Internet Engineering Task Force, 49 pages.

* cited by examiner

TCP SEQUENCE NUMBER RECOVERY IN A REDUNDANT FORWARDING SYSTEM

BACKGROUND OF THE INVENTION

The present invention relates to networking technology. More particularly, the present invention relates to providing redundant and not-stop forwarding in a network through an active router and a standby router.

Local area networks (LANs) are commonly connected with one another through one or more routers so that a host (a PC or other arbitrary LAN entity) on one LAN can communicate with other hosts on different LANs. Typically, the host is able to communicate directly only with the entities on its local LAN segment. When it receives a request to send a data packet to an address that it does not recognize as being local, it communicates through a router (or other layer-3 device) which determines how to direct the packet between the host and the destination address. Unfortunately, a router may, for a variety of reasons, become inoperative (e.g., a power failure, rebooting, scheduled maintenance, etc.). Such potential router failure has led to the development and use of redundant systems, systems having more than one router to provide a back up in the event of primary router failure. When a router fails, the host communicating through the inoperative router may still remain connected to other LANs if it can send packets to another router connected to its LAN.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default" router. In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host can not send packets outside of its LAN. This will be true even though there may be a redundant router able to take over because the host does not know about the backup. Unfortunately, such systems have been used in mission critical applications such as stock trading. The shortcomings of these early systems led to the development and implementation of a hot standby router protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 patent"), entitled STANDBY ROUTER PROTOCOL, issued Dec. 5, 1995 to Cisco Systems, Inc., which is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which is incorporated herein by reference in its entirety for all purposes.

HSRP forwards data packets from a host on a LAN through a virtual router. The host is configured so that the packets it sends to destinations outside of its LAN are always addressed to the virtual router. The virtual router may be any physical router elected from among a group of routers connected to the LAN. The router from the group that is currently emulating the virtual router is referred to as the "active" router. Thus, packets addressed to the virtual router are handled by the active router. A "standby" router, also from the group of routers, backs up the active router so that if the active router becomes inoperative, the standby router automatically begins emulating the virtual router. This allows the host to always direct data packets to an operational router without monitoring the routers of the network.

Non Stop forwarding (NSF) is the capability for system to maintain calls and their state even in the event of a hardware software fault on the active router. In order to achieve this, checkpointing is generally done between active and standby routers, such that all recent call states that are present on the active router are transferred to the standby router. Note that this needs to be done as soon as any state change occurs in the event of a catastrophic fault, e.g., a switchover occurs in which the standby router then becomes the active router.

The number of checkpointing transactions that are required to keep two processors in synchronization for most types of calls is limited. Generally, checkpointing transactions need to take place as a call is accepted into the system, as state changes occur during call setup (optional in many NSF highly available systems), once the call reaches steady state, and then at call termination. For the majority of call types there is no state change that requires checkpointing between the time the call reaches steady state and the time that the call terminates. However, there are some types of calls, such as TCP connections where one end terminates on a router, which are difficult to checkpoint in such a way that NSF may be achieved.

The TCP protocol provides for recovery from data that is damaged, lost, duplicated, or delivered out of order by the internet communication system. TCP Protocol is described in detail in RFC 793, entitled "Transmission Control Protocol (TCP)", by the Information Sciences Institute, University of Southern California, which RFC document is incorporated herein by reference in its entirety for all purposes. This recovery mechanism is achieved by assigning a sequence number to the segment transmitted, and requiring a positive acknowledgement (ACK) from the receiving TCP endpoint. If the ACK is not received within a timeout interval, the segment is retransmitted. At the receiver, the sequence numbers (SEQ) are used to correctly order segments that may be received out of order and to eliminate duplicates. A transmit and receive window is maintained on each end of the connection and determines the valid range of SEQ and ACK numbers that will be accepted.

For a router which is the endpoint for a large number of concurrent TCP connections it may not be possible to continuously checkpoint the sequence and acknowledgment numbers that are transmitted in each TCP connection due to the speed of the data being transmitted. This is especially true if there are a large number of concurrent TCP connections for which the router is an endpoint. Hence, there is some state that cannot be preserved during switchover to the standby router. However, knowledge of the TCP sequence numbers is an essential component required for the operation of a TCP connection. The receiver will discard any packet that it receives that is not within its window of valid SEQ numbers. Likewise, the sender will discard an acknowledgement packet should the received ACK number not be in the valid window. Thus, the connection will be dropped if reasonably current sequence numbers are lost during the switchover.

In view of the above, it would be desirable to reliably provide recovery of a TCP connection terminated on a router after a router switchover event.

SUMMARY OF THE INVENTION

Accordingly, the present invention provides methods and apparatus for facilitating recovery of a data connection that was established between an active router and a host. The data connection is a type of connection that tracks the sequence of data sent between the router and the host. This recovery may occur after a standby router takes over for the active router. For example, a Transmission Control Protocol (TCP) connection between the active router and a host may be recovered after a router switchover (e.g., when the standby router takes over for the active router in a hot standby router protocol system). To accomplish this, at least one sequence number that is associated with data sent from the active router (to the host) is sent to the standby router, and at least one sequence number from data sent from the host is also sent to the standby router. For example, the sequence numbers set to the standby router include the initial SYN packet sent by the active router and the SYN packet sent by the host in response to the active router's SYN packet. These two sequence numbers are obtained for each connection in which the active router is an endpoint. When the standby takes over for the previously active router, the new active router may then recover the connection by sending these two sequence numbers within an acknowledgement packet to the host. The host then responds with the correct sequence numbers for the connection, and the standby router can then continue data transmission to the host using the correct sequence numbers.

In one embodiment, a method for forwarding data within a redundant system having an active router and a standby router is disclosed. A first packet that forms part of a data connection is sent. The first packet has a first send sequence number and the first packet is sent from the active router to a receiver. The data connection is a type of connection that tracks the sequence of data sent between the active router and the receiver. The active router or the receiver may be the initiator of the connection. A second packet having an associated first receive sequence number is received. The second packet is received into the active router from the receiver. The first send sequence number and the first receive sequence number are communicated to the standby router.

In a specific implementation, when the standby router replaces the first active router as a second active router, a sequence number recovery packet is sent from the second active router to the receiver. The sequence number recovery packet has an associated sequence number and an associated acknowledgement number. The first send sequence number is used as the sequence number associated with the sequence number recovery packet, and the first receive sequence number is used as the acknowledgement number associated with the sequence number recovery packet. In response to the sequence number recovery packet, a sequence recovery information packet is received from the receiver into the second active router. The sequence recovery information packet has an associated sequence number and an associated acknowledgement number. A data packet is sent from the second active router to the receiver. The data packet includes the sequence number and the acknowledgement number that are associated with the sequence recovery information packet.

In a specific embodiment, the data connection is a Transmission Control Protocol (TCP) connection. The sequence number recovery packet and sequence recovery information packet are each an acknowledgement packet. The first and second packets that are used in the sequence number recovery packet may correspond to any packets sent by the active router or receiver, respectively. In one embodiment, the first packet establishes a start of the TCP connection (e.g. in the form of a SYN packet), and the second packet is in response to the first packet. In one aspect, the first packet is an acknowledgement packet for the second packet, and the second packet is sent prior to the first packet. In another aspect, the connection is a TCP connection; the first packet is a SYN packet; and the second packet is a data packet. In yet another aspect, the connection is a TCP connection, and both the first and second packets are data packets and not SYN or acknowledgement packets.

In a further implementation, a plurality of subsequent send packets that form part of the data connection are continually sent. Each of the packets have an associated send sequence number, and the plurality of subsequent send packets are sent from the active router to the receiver. A plurality of subsequent receive packets that each have an associated receive sequence number are continually received. The subsequent receive packets are received into the active router from the receiver in response to the subsequent send packets. The send sequence numbers and the receive sequence numbers associated with the subsequent receive and send packets are periodically communicated, respectively, to the standby router as replacements for the first receive and send sequence numbers, respectively.

In another embodiment, the invention pertains to a network system operable to forward data within a redundant system having an active router and a standby router. The network system includes an active router and a standby router that are operable to provide at least some of the above described method operations. In yet a further embodiment, the invention pertains to a computer program product for forwarding data within a redundant system having an active router and a standby router. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
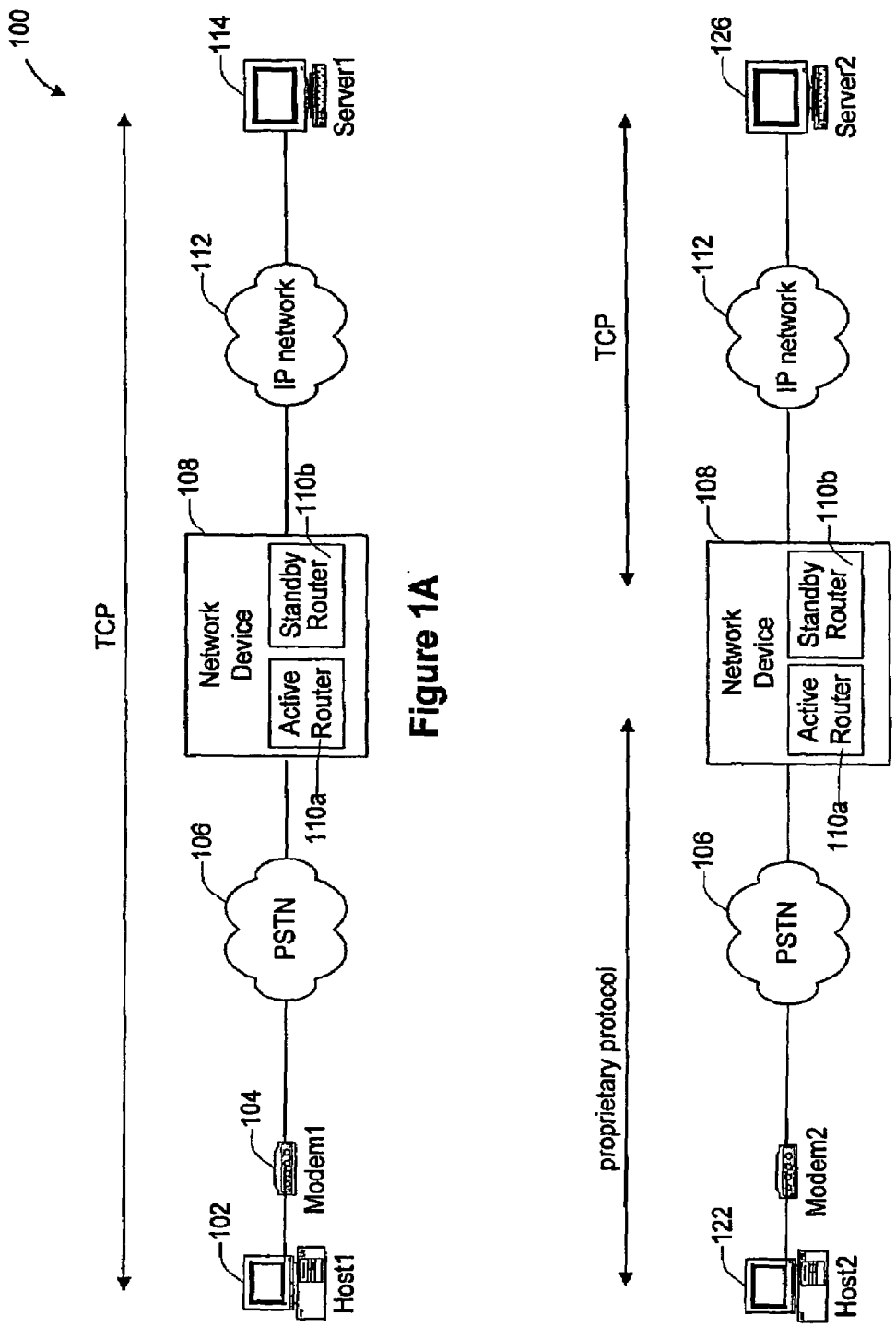
FIG. 1A is a diagrammatic representation of a type of network connection for which the techniques of the present invention are not required to be implemented.
FIG. 1B is a diagrammatic representation of a type of network connection for which the techniques of the present invention may be implemented.

FIG. 1A is a diagrammatic representation of a type of network connection for which the techniques of the present invention are not required to be implemented. As shown, a network 100 includes a host 102 which sets up a TCP connection with a server 114. Host 102 sends packets through modem 104, Public Service (or Switched) Telephone Network (PSTN) 106, network device 108, and IP network 112 to server 114. The network device 108 includes redundant routers 110a and 110b. Alternatively, these routers 110 may be separate router devices that work together as a redundant router group.

Router 110a initially serves as an active router, and router 110b initially serves as a standby router. In one embodiment, the routers 110 of the network device 108 are configured to implement hot standby router protocol (HSRP). Several HSRP mechanisms are described in detail in the above referenced RFC 2281 document and '599 patent, which are incorporated herein in their entirety. Of course, any suitable redundancy techniques may be implemented in conjunction with the techniques of the present invention. As shown, a TCP connection has been established between host 102 and server 114. The active router 110a forwards packets between host 102 and server 114. When the active router 110a fails or goes down, the standby router 110b then takes over and forwards packets between host 102 and server 114. The redundant router group may also include other routers (not shown), besides routers 110, and one of these other routers may now take over as the standby router.

The routers within the redundant router group (e.g., routers 110a and 110b) do not need to track the sequence numbers of the TCP connection. That is, when the active router fails and the standby router takes over as the new active router, the new active router does not have to re-establish the TCP connection. The host 102 and server 114 are in charge of the TCP connection since they form the end points of the TCP connection. The host 102 and server 114 continue to communicate packets to each other through the new active router. In sum, the host 102 and server 114 continue to track the most current sequence numbers that are to be associated with data sent between the host 102 and server 114. This tracking is not disrupted by the switchover from the active router to the new active router.

Conventionally, a TCP connection is disrupted when a switchover occurs and the redundant routers serve as an endpoint for such connection. When the network device 108 functions as a TCP connection endpoint, techniques are provided within the present invention for tracking sequence numbers of data portions within a TCP connection so that the TCP connection may be recovered during a router switchover, while minimizing the number of checkpoints between the active router and the standby router. In other words, the number of sequence numbers that are communicated from the active router to the standby router (or other router(s) of the redundant group) is minimized. The techniques of the present invention may be applied to other connection protocols (besides TCP) that track the sequence of data sent between any two hosts.

FIG. 1B is a diagrammatic representation of a type of network connection for which the techniques of the present invention may be implemented. In this example, the redundant routers (e.g., 110a and 110b) serve as an endpoint for the TCP connection. Although the techniques of the present invention are described in terms of being implemented within redundant routers that form part of a single network device 108, these techniques may be implemented on any suitable configuration of redundant routers which together form a network system. That is, each router within the redundant network system may be a stand alone device or any number of routers may be integrated within a single device. Additionally, the redundant routers may include other routers besides the active router and the standby router. Additionally, the invention is described as tracking sequence numbers of data "packets", and the term "packet" is meant to include any type of data, such as a segment or frame.

As shown, host 122 communicates with the network device 108 using a proprietary protocol. However, the host 122 may communicate with the network device using any suitable standard protocol. In particular applications, when a host communicates with the network device 108 using a particular proprietary protocol, the network device 108 initiates a TCP connection with a corresponding server (e.g., 126) For example, when a host 122 wishes to communicate with an America Online (AOL) server 126, the network device 108 tunnels communications from the host 122 to the network device 108 into a TCP connection established between the network device 108 and server 126.

In general terms, the present invention provides mechanisms for tracking at least a sequence number associated with the network device and a sequence number associated with the server 126 with respect to the TCP connection. More generally, mechanisms are provided for tracking or retaining at least two sequence numbers associated with both the sender and receiver (or endpoints) within a particular connection, such as a TCP connection. These retained sequence numbers may later be used to recover the connection when the standby router 110b takes over for the previously active router 110a.

Figure 2:
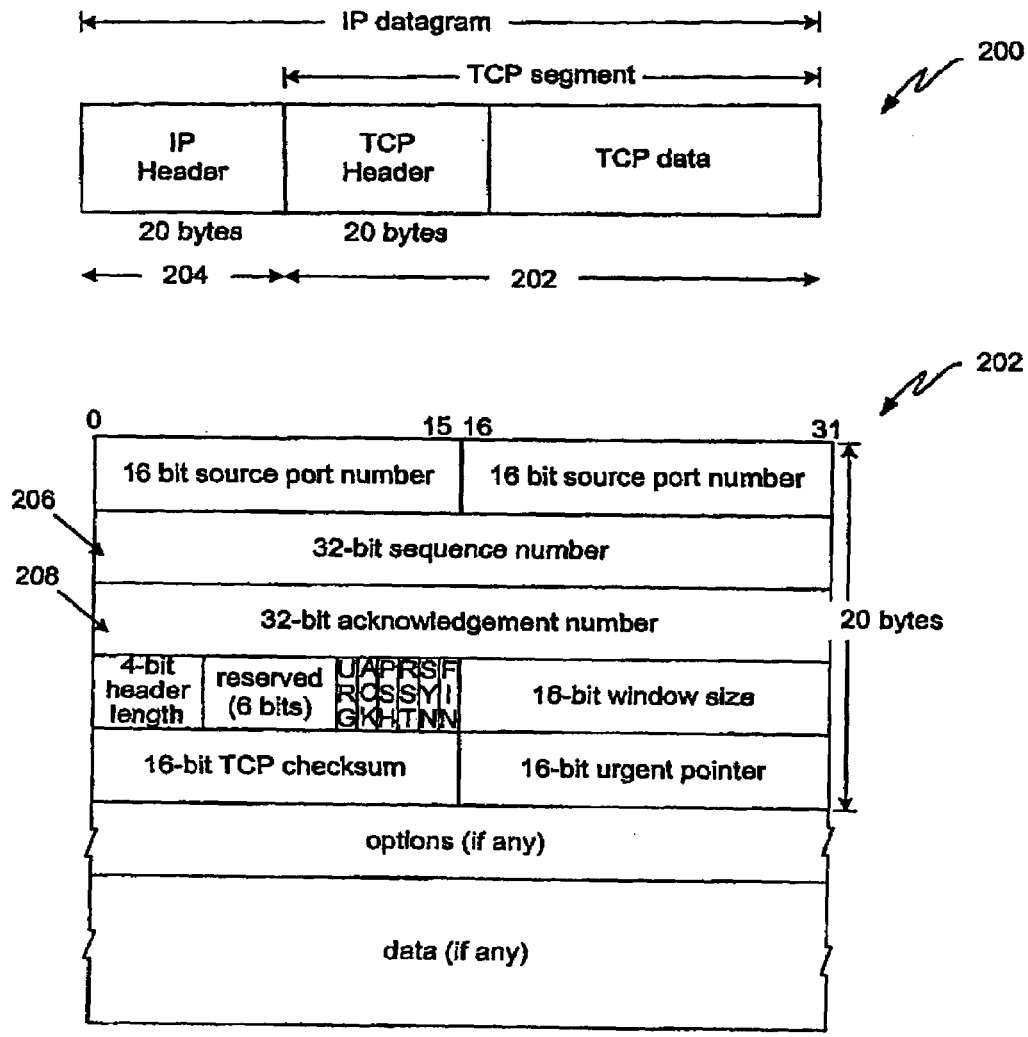
FIG. 2 is a diagrammatic representation of a internet protocol (IP) datagram having sequence numbers that may be tracked during implementation of one embodiment of the present invention.

FIG. 2 is a diagrammatic representation of a internet protocol (IP) datagram 200 having sequence numbers that may be tracked during implementation of one embodiment of the present invention. As shown, the IP datagram includes an IP header 204 and a TCP segment 202. The TCP segment 202 includes a 32 bit sequence number 206 and a 32 bit acknowledgment number 208. Of course, the sequence number and acknowledgement number may have any length, besides 32 bits. The sequence number 206 specifies a count of the packets sent so far by the sender of the present IP datagram 200. The acknowledgment number 208 corresponds to a sequence number that was last received by the sender of the current IP datagram 200. Although the present invention is described in terms of sequence numbers and acknowledgment numbers of a TCP segment, the techniques of the present invention may be implemented on any form of a connection type protocol that tracks the sequence of data sent between two hosts and sends an error message having the correct sequence numbers (e.g., ACK for the TCP protocol) when the incorrect sequence numbers have been received.

Figure 3:
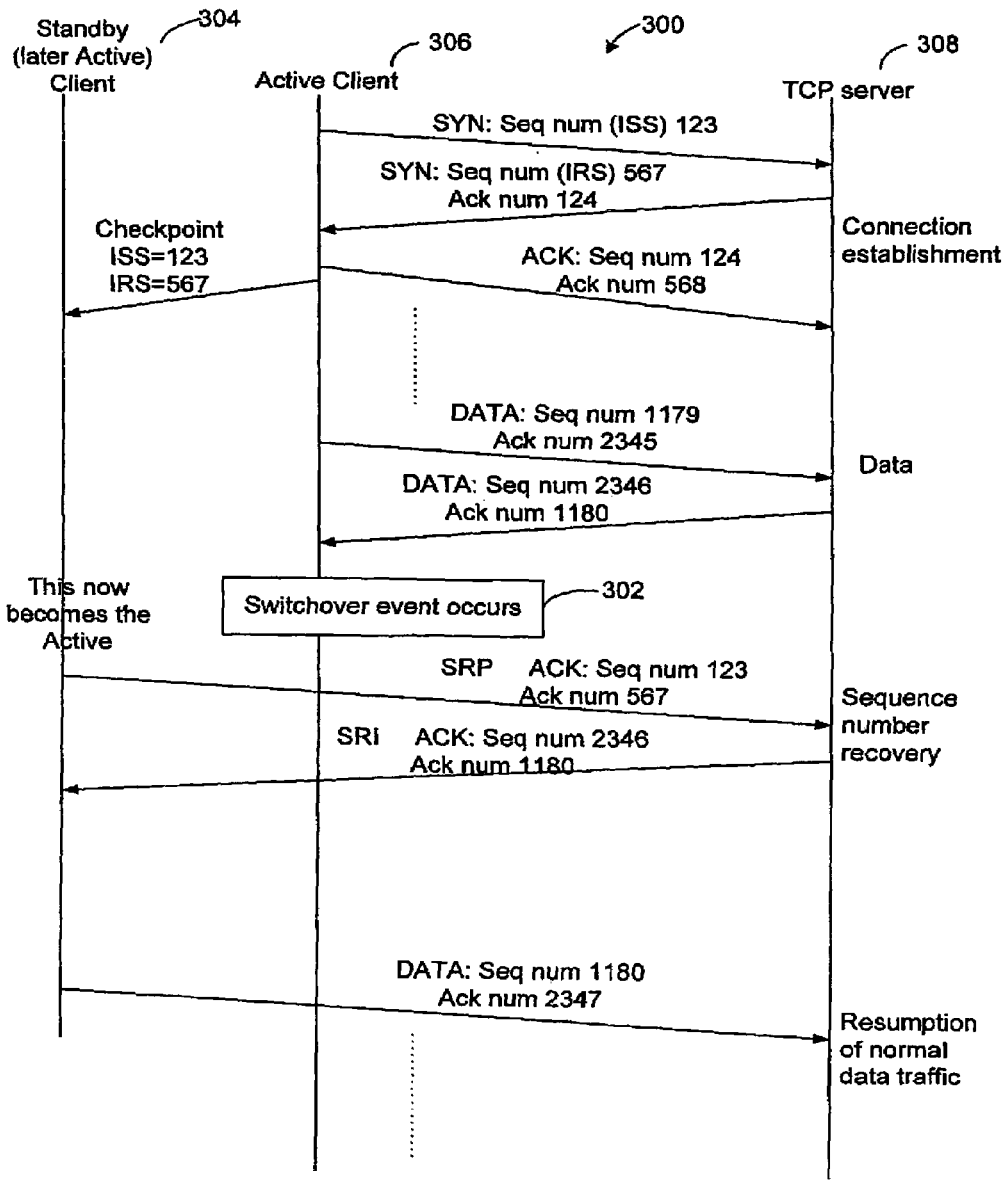
FIG. 3 is a communication diagram that illustrates a connection recovery technique in accordance with one embodiment of the present invention.

Any suitable mechanisms may be used to facilitate recovery of a connection after a router switchover. FIG. 3 is a communication diagram that illustrates a connection recovery technique 300 in accordance with one embodiment of the present invention. Initially, an active client (e.g., active router) 306 sends a SYN packet having sequence number 123 to a TCP server 308. The active client 306 may choose any suitable initial sequence number. The TCP server 308 then responds to the active client's SYN packet with its own SYN packet having a sequence number 567 and an acknowledgment number 124. The acknowledgment number corresponds to the sequence number of the SYN packet sent by the active client 306 to the server 308 incremented by one.

The sequence number of the active client's SYN packet is referred herein as an initial send sequence number (ISS), and the sequence number of the TCP server's SYN packet is referred herein as the initial received sequence number (IRS). The sequence number of the SYN packet sent by the TCP server 308 may be any suitable initial value. After the active client 306 receives a SYN packet from the TCP server 308, the active client 306 then sends an acknowledgment packet having a sequence number 124 (which is the last sequence number used by the client in the previous transmission to the server incremented by one) and an acknowledgement number 568 (which is the last received sequence number from the server incremented by one) to the TCP server. After completion of this three-way handshake, the TCP connection is now established and data communication may occur.

After the active client 306 sends the ISS and receives the IRS from the server 308, the ISS and IRS may then be communicated to the standby client. As shown, the active client 306 sends the ISS and IRS to the standby client 304 after the active client 306 sends the acknowledgment packet to the TCP server. Of course, the ISS and IRS may also be sent at other times. In another implementation, the active client 306 may send the ISS after or before sending the initial SYN packet to the TCP server 308 or after receiving the SYN packet from the TCP server. Likewise, the active client may send the IRS as soon as it is received.

After the connection is established, data may be transmitted between the active client and the TCP server. The active client 306 and server 308 continue to increment their respective sequence numbers and acknowledgement numbers during this data transmission.

In an alternative embodiment, other sequence numbers may be sent besides the ISS and/or the IRS. For example, the active client 306 may transmit a sequence number of the acknowledgment packet (sent from the active client to the TCP server) to the standby client, instead of the ISS. Likewise, the active client 306 may transmit the acknowledgment number 568 (transmitted from the active client to the server) to the standby client, instead of the IRS. In another alternative embodiment, the sequence number of any data packet (e.g., sequence number 1179 and acknowledgment number 2345) may be sent to the standby client so that the standby client obtains at least two sequence numbers associated with data sent from both the active client and server. In yet another implementation, the active client may periodically send sequence numbers associated with data (sent from the active client and from the server) to the standby client after a predetermined time period. Regardless of form, the standby client saves these communicated sequence numbers to be used later to recover from a swtichover event.

After the active client fails in a switchover event 302, the standby client then becomes the active client. To recover the TCP connection to the TCP server, the now active client 304 sends a sequence number recovery packet (SRP) to the TCP server 308. The SRP includes a sequence number and an acknowledgment number that correspond to the ISS and IRS, respectively, that were previously communicated to the standby client 304. In the illustrated embodiment, the sequence number recovery packet is an acknowledgment type packet. In response, the TCP server sends a sequence number recovery information packet (SRIP) in the form of an acknowledgment packet to the now active client 304. The SRIP includes the current sequence numbers that were being used prior to the switchover event.

In the illustrated embodiment, the last data that was sent by the server 308 to the previously active server 306 prior to the switchover event had a last sequence number of 2346 and a last acknowledgement number of 1180. In the current TCP implementation, the server will send a repeat of its lastly sent sequence and acknowledgement numbers in response to an incorrect sequence and acknowledgement numbers received from the new active client 304. Thus, the SRIP includes a sequence number 2346 and an acknowledgment number 1180. The now active client 304 then sends data having a sequence number and acknowledgment number that were obtained from the SRIP. Normal data traffic then resumes.

Generally, the techniques for recovering a connection after a router switchover event of the present invention may be implemented on software and/or hardware. For example, the recovery techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000, available from Cisco Systems, Inc. of San Jose, Calif. The recovery techniques of this invention may be specially configured redundant router models Catalyst 5000, 6000 and AS5850 available from Cisco Systems, Inc. of San Jose, Calif. A general architecture for some of these machines will appear from the description given below. In an alternative embodiment, the network system (e.g., recovery techniques) may be implemented on a general-purpose network host machine such as a personal computer or workstation. Further, the invention may be at least partially implemented on a card (e.g., an interface card) for a network device or a general-purpose computing device.

Figure 4:
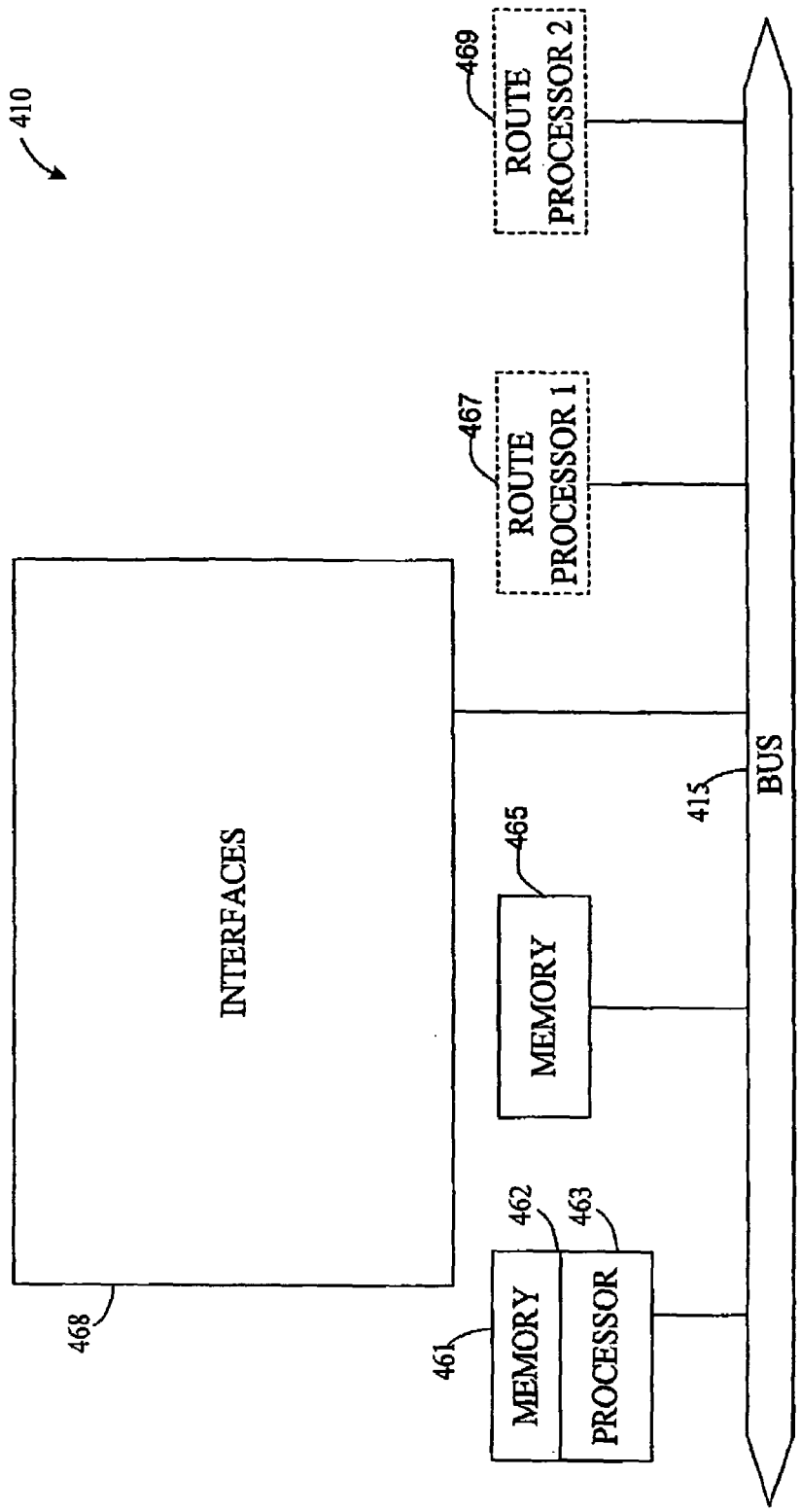
FIG. 4 is a diagrammatic representation of a network system suitable for implementing the present invention.

Referring now to FIG. 4, a network system 410 suitable for implementing the present invention includes a first route processor 467, a second router processor 469, a master central processing unit (CPU) 462, interfaces 468, and a bus 415 (e.g., a PCI bus). When acting under the control of appropriate software or firmware, the CPU 462 is responsible for network management. Each of the route processors 467 and 469 may also include a processor and memory (not shown) that are together responsible for implementing various routing tasks, HSRP techniques, and the recovery techniques of the present invention. The route processors and CPU 462 preferably accomplish all these functions under the control of software including an operating system (e.g., the Internetwork Operating System (IOS®) of Cisco Systems, Inc.) and any appropriate applications software. CPU 462 and the route processors may each include one or more processors (e.g. 463), such as a processor from the Motorola family of microprocessors or the MIPS family of microprocessors. In an alternative embodiment, processor 463 is specially designed hardware for controlling the operations of network system 410. In a specific embodiment, a memory 461 (such as non-volatile RAM and/or ROM) also forms part of CPU 462. However, there are many different ways in which memory could be coupled to the system. Memory block 461 may be used for a variety of purposes such as, for example, caching and/or storing data, programming instructions, etc.

The interfaces 468 are typically provided as interface cards (sometimes referred to as "line cards"). Generally, they control the sending and receiving of data packets or data segments over the network and sometimes support other peripherals used with the network system 410. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 and route processors 467 and 469 to efficiently perform routing computations, network diagnostics, security functions, etc.

Although the system shown in FIG. 4 is one specific network system of the present invention, it is by no means the only network system architecture on which the present invention can be implemented. For example, an architecture having a single processor that handles communications as well as routing computations, etc. is often used. Further, other types of interfaces and media could also be used with the network system.

Regardless of network system's configuration, it may employ one or more memories or memory modules (such as, for example, memory block 465 and the memory of each route processor) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, two or more sequence numbers and acknowledgement numbers from each connection, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for forwarding data within a redundant system having an active network device and a standby network device, the method comprising:

sending a first packet that forms part of a data connection, the first packet having a first send sequence number and the first packet being sent from the active network device to a receiver, wherein the data connection is a type of connection that tracks the sequence of data sent between the active network device and the receiver;

receiving a second packet having an associated first receive sequence number, and the second packet being received into the active network device from the receiver;

sending a third packet that forms part of the data connection from the active network device to the receiver, wherein the third packet has a second send sequence number; and communicating the first send sequence number and the first receive sequence number to the standby network device without communicating the second send sequence number to the standby network device.

2. A method as recited in claim 1, further comprising:

when the standby network device replaces the first active network device as a second active network device, sending a sequence number recovery packet from the second active network device to the receiver, the sequence number recovery packet having an associated sequence number and an associated acknowledgement number, wherein the first send sequence number is used as the sequence number associated with the sequence number recovery packet and the first receive sequence number is used as the acknowledgement number associated with the sequence number recovery packet;

in response to the sequence number recovery packet, receiving a sequence recovery information packet from the receiver into the second active network device, the sequence recovery information packet having an associated sequence number and an associated acknowledgement number; and sending a data packet from the second active network device to the receiver, the data packet including the sequence number and the acknowledgement number that are associated with the sequence recovery information packet.

3. A method as recited in claim 2, wherein the data connection is a Transmission Control Protocol (TCP) connection.

4. A method as recited in claim 3, wherein the sequence number recovery packet and sequence recovery information packet are each an acknowledgement packet.

5. A method as recited in claim 3, wherein the first packet establishes a start of the TCP connection.

6. A method as recited in claim 5, wherein the first packet is a SYN packet.

7. A method as recited in claim 2, wherein the second packet is in response to the first packet.

8. A method as recited in claim 2, wherein the first packet is an acknowledgement packet for the second packet, the second packet being sent prior to the first packet.

9. A method as recited in claim 2, wherein the connection is a TCP connection, the first packet is a SYN packet, and the second packet is a data packet.

10. A method as recited in claim 2, wherein the connection is a TCP connection, and wherein both the first and second packets are data packets and not SYN or acknowledgement packets.

11. A method as recited in claim 2, wherein the redundant system is a checkpointed non-stop forwarding system.

12. A method as recited in claim 1, further comprising:
continuing to send a plurality of subsequent send packets that forms part of the data connection, each of the packets each having an associated send sequence number and the plurality of subsequent send packets being sent between the active network device to the receiver;
continuing to receive a plurality of subsequent receive packets that each have an associated receive sequence number, and the subsequent receive packets being received into the active network device from the receiver in response to the subsequent send packets; and
periodically communicating some but not all of the send sequence numbers and the receive sequence numbers associated with the subsequent receive and send packets, respectively, to the standby network device as replacements for the first receive and send sequence numbers, respectively.

13. A network system operable to forward data within a computer network, the network system comprising:
an active network device configured to forward data within the computer network; and
a standby network device configured to replace the active network device when the active network device fails,
wherein the active network device is operable to:
send a first packet that forms part of a data connection, the first packet having a first send sequence number and the first packet being sent from the active network device to a receiver, wherein the data connection is a type of connection that tracks the sequence of data sent between the active network device and the receiver;
receive a second packet having an associated first receive sequence number, and the second packet being received into the active network device from the receiver;
send a third packet that forms part of the data connection from the active network device to the receiver, wherein the third packet has a second send sequence number; and
communicate the first send sequence number and the first receive sequence number to the standby network device without communicating the second send sequence number to the standby network device.

14. A network system as recited in claim 13, wherein the active network device is a separate device from the standby network device.

15. A network system as recited in claim 13, wherein the standby network device is further operable to:
send a sequence number recovery packet from the second active network device to the receiver when the standby network device replaces the first active network device as a second active network device, the sequence number recovery packet having an associated sequence number and an associated acknowledgement number, wherein the first send sequence number is used as the sequence number associated with the sequence number recovery packet and the first receive sequence number is used as the acknowledgement number associated with the sequence number recovery packet,
in response to the sequence number recovery packet, receive a sequence recovery information packet from the receiver into the second active network device, the sequence recovery information packet having an associated sequence number and an associated acknowledgement number, and
send a data packet from the second active network device to the receiver, the data packet including the sequence number and the acknowledgement number that are associated with the sequence recovery information packet.

16. A network system as recited in claim 15, wherein the data connection is a Transmission Control Protocol (TCP) connection.

17. A network system as recited in claim 16, wherein the sequence number recovery packet and sequence recovery information packet are each an acknowledgement packet.

18. A network system as recited in claim 16, wherein the first packet establishes a start of the TCP connection.

19. A network system as recited in claim 18, wherein the first packet is a SYN packet.

20. A network system as recited in claim 15, wherein the second packet is in response to the first packet.

21. A network system as recited in claim 15, wherein the first packet is an acknowledgement packet for the second packet, the second packet being sent prior to the first packet.

22. A network system as recited in claim 15, wherein the connection is a TCP connection, the first packet is a SYN packet, and the second packet is a data packet.

23. A network system as recited in claim 15, wherein the connection is a TCP connection, and wherein both the first and second packets are data packets and not SYN or acknowledgement packets.

24. A network system as recited in claim 15, wherein the network system is a checkpointed non-stop forwarding system.

25. A network system as recited in claim 13, wherein the active network device is further operable to:

continue to send a plurality of subsequent send packets that forms part of the data connection, each of the packets each having an associated send sequence number and the plurality of subsequent send packets being sent from the active network device to the receiver;

continue to receive a plurality of subsequent receive packets that each have an associated receive sequence number, and the subsequent receive packets being received into the active network device from the receiver in response to the subsequent send packets; and periodically communicate some but not all of the send sequence numbers and the receive sequence numbers associated with the subsequent receive and send packets, respectively, to the standby network device as replacements for the first receive and send sequence numbers, respectively.

26. A computer program product for forwarding data within a redundant system having an active network device and a standby network device, the computer program product comprising:

at least one computer readable medium;

computer program instructions stored within the at least one computer readable product configured to cause the redundant system to:

send a first packet that forms part of a data connection, the first packet having a first send sequence number and the first packet being sent from the active network device to a receiver, wherein the data connection is a type of connection that tracks the sequence of data sent between the active network device and the receiver;

receive a second packet having an associated first receive sequence number, and the second packet being received into the active network device from the receiver;

send a third packet that forms part of the data connection from the active network device to the receiver, wherein the third packet has a second send sequence number; and communicate the first send sequence number and the first receive sequence number to the standby network device without communicating the second send sequence number to the standby network device.

27. A computer program product as recited in claim 26, wherein the computer program instructions stored within the at least one computer readable product are further configured to cause the redundant system to:

when the standby network device replaces the first active network device as a second active network device, send a sequence number recovery packet from the second active network device to the receiver, the sequence number recovery packet having an associated sequence number and an associated acknowledgement number, wherein the first send sequence number is used as the sequence number associated with the sequence number recovery packet and the first receive sequence number is used as the acknowledgement number associated with the sequence number recovery packet;

in response to the sequence number recovery packet, receive a sequence recovery information packet from the receiver into the second active network device, the sequence recovery information packet having an associated sequence number and an associated acknowledgement number; and send a data packet from the second active network device to the receiver, the data packet including the sequence number and the acknowledgement number that are associated with the sequence recovery information packet.

28. A computer program product as recited in claim 27, wherein the data connection is a Transmission Control Protocol (TCP) connection.

29. A computer program product as recited in claim 28, wherein the first packet establishes a start of the TCP connection.

30. A computer program product as recited in claim 29, wherein the first packet is a SYN packet.

31. A computer program product as recited in claim 27, wherein the second packet is in response to the first packet.

32. A computer program product as recited in claim 26, wherein the computer program instructions stored within the at least one computer readable product are further configured to cause the redundant system to:

continue to send a plurality of subsequent send packets that forms part of the data connection, each of the packets each having an associated send sequence number and the plurality of subsequent send packets being sent from the active network device to the receiver;

continue to receive a plurality of subsequent receive packets that each have an associated receive sequence number, and the subsequent receive packets being received into the active network device from the receiver in response to the subsequent send packets; and periodically communicate some but not all of the send sequence numbers and the receive sequence numbers associated with the subsequent receive and send packets, respectively, to the standby network device as replacements for the first receive and send sequence numbers, respectively.

33. An apparatus for forwarding data within a redundant system having an active network device and a standby network device, the apparatus comprising:

means for sending a first packet that forms part of a data connection, the first packet having a first send sequence number and the first packet being sent from the active network device to a receiver, wherein the data connection is a type of connection that tracks the sequence of data sent between the active network device and the receiver;

means for receiving a second packet having an associated first receive sequence number, and the second packet being received into the active network device from the receiver;

means for sending a third packet that forms part of the data connection from the active network device to the receiver, wherein the third packet has a second send sequence number; and means for communicating the first send sequence number and the first receive sequence number to the standby network device without communicating the second send sequence number to the standby network device.

34. An apparatus as recited in claim 33, further comprising:

means for sending a sequence number recovery packet from the second active network device to the receiver when the standby network device replaces the first active network device as a second active network device, the sequence number recovery packet having an associated sequence number and an associated acknowledgement number, wherein the first send sequence number is used as the sequence number associated with the sequence number recovery packet and the first receive sequence number is used as the acknowledgement number associated with the sequence number recovery packet;

means for, in response to the sequence number recovery packet, receiving a sequence recovery information packet from the receiver into the second active network device, the sequence recovery information packet having an associated sequence number and an associated acknowledgement number; and means for sending a data packet from the second active network device to the receiver, the data packet including the sequence number and the acknowledgement number that are associated with the sequence recovery information packet.

\* \* \* \* \*